US011351864B2

(12) United States Patent
Dobashi et al.

(10) Patent No.: US 11,351,864 B2
(45) Date of Patent: Jun. 7, 2022

(54) SNOWPLOW, PROJECTION METHOD FOR SNOWPLOW, STORAGE MEDIUM, AND PROJECTION SYSTEM

(71) Applicant: HONDA MOTOR CO., LTD., Tokyo (JP)

(72) Inventors: Manabu Dobashi, Wako (JP); Koji Kuriyagawa, Wako (JP); Hiroshi Yamakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/026,490

(22) Filed: Sep. 21, 2020

(65) Prior Publication Data

US 2021/0001724 A1   Jan. 7, 2021

Related U.S. Application Data

(63) Continuation of application No. PCT/JP2018/012920, filed on Mar. 28, 2018.

(51) Int. Cl.
*B60K 35/00* (2006.01)
*H04N 9/31* (2006.01)
(Continued)

(52) U.S. Cl.
CPC ............... *B60K 35/00* (2013.01); *E01H 5/00* (2013.01); *G08B 5/00* (2013.01); *H04N 9/3185* (2013.01);
(Continued)

(58) Field of Classification Search
CPC ............ B60K 35/00; B60K 2370/1529; B60K 2370/31; B60K 2370/10; B60K 2370/16;
(Continued)

(56) References Cited

U.S. PATENT DOCUMENTS 6,009,642 A * 1/2000 Nugent .................... E01H 5/00
 37/197
2003/0149607 A1* 8/2003 Ogasawara ............ G06Q 99/00
 705/7.12
(Continued)

FOREIGN PATENT DOCUMENTS

JP      2001-83262 A     3/2001
JP      2002-157676 A    5/2002
(Continued)

OTHER PUBLICATIONS

International Search Report dated May 15, 2018, issued in counterpart application No. PCT/JP2018/012920, w/English translation (5 pages).
(Continued)

*Primary Examiner* — Chico A Foxx
(74) *Attorney, Agent, or Firm* — WHDA, LLP

(57) ABSTRACT

A snowplow having a snow removal mechanism, the snowplow comprises: an obtainment unit configured to obtain topography information prior to snow accumulation; and a projection unit configured to, based on the topography information prior to snow accumulation obtained b the obtainment unit, project an image indicating the topography information prior to snow accumulation on a surface of accumulated snow that is to be removed by the snow removal mechanism.

13 Claims, 15 Drawing Sheets

(51) Int. Cl.
*G08B 5/00* (2006.01)
*E01H 5/00* (2006.01)
*E01H 5/09* (2006.01)

(52) U.S. Cl.
CPC .... *B60K 2370/10* (2019.05); *B60K 2370/155* (2019.05); *B60K 2370/1529* (2019.05); *B60K 2370/16* (2019.05); *B60K 2370/29* (2019.05); *B60K 2370/31* (2019.05); *E01H 5/098* (2013.01)

(58) Field of Classification Search
CPC .......... B60K 2370/29; B60K 2370/155; E01H 5/00; E01H 5/098; G08B 5/00; H04N 9/3185
See application file for complete search history.

(56) References Cited

U.S. PATENT DOCUMENTS

| | | | | |
|---|---|---|---|---|
| 2007/0022639 A1* | 2/2007 | Sueshige | ................ | E01H 5/045 37/260 |
| 2007/0169384 A1* | 7/2007 | Stephan | ................... | E01H 5/06 37/281 |
| 2007/0277403 A1* | 12/2007 | Summer | ................ | G06Q 10/08 37/234 |
| 2010/0033639 A1* | 2/2010 | Maruyama | ........... | H04N 21/485 348/744 |
| 2013/0018577 A1* | 1/2013 | Gooding | ............ | G01C 21/3691 701/423 |
| 2013/0190981 A1* | 7/2013 | Dolinar | ............. | F16M 11/2014 701/41 |
| 2014/0130384 A1* | 5/2014 | Favorito | ................... | E01H 5/04 37/242 |
| 2014/0180478 A1* | 6/2014 | Letsky | ..................... | E01H 5/00 700/258 |
| 2014/0283398 A1* | 9/2014 | Galyean | ............ | B65G 69/2882 33/228 |
| 2015/0229821 A1* | 8/2015 | Matsuno | .................. | G03B 7/08 348/239 |
| 2017/0099473 A1* | 4/2017 | Nakaguchi | ............. | G03B 21/14 |
| 2017/0109672 A1* | 4/2017 | Sarin | ................ | G06Q 10/06313 |
| 2017/0268190 A1* | 9/2017 | Moore | ...................... | E01H 5/00 |
| 2019/0031080 A1* | 1/2019 | Kimura | ................... | B60Q 1/24 |
| 2019/0135169 A1* | 5/2019 | Conger | ................ | G05D 1/0257 |
| 2019/0187693 A1* | 6/2019 | Towers | ................ | G05D 1/0022 |
| 2019/0323190 A1* | 10/2019 | Waelbers | ............. | G05D 1/0011 |

FOREIGN PATENT DOCUMENTS

| | | | |
|---|---|---|---|
| JP | 2002-333325 A | | 11/2002 |
| JP | 2005-9238 A | | 1/2005 |
| JP | 2005-242460 A | | 9/2005 |
| JP | 2005242460 A | * | 9/2005 |
| JP | 2013-33426 A | | 2/2013 |
| JP | 2013033426 A | * | 2/2013 |
| JP | 2015-220661 A | | 12/2015 |
| JP | 5905688 B2 | * | 4/2016 |
| WO | 2015/141080 A1 | | 9/2015 |

OTHER PUBLICATIONS

Written Opinion dated May 15, 2018, issued in counterpart application No. PCT/JP2018/012920 (6 pages).

* cited by examiner

F I G. 10
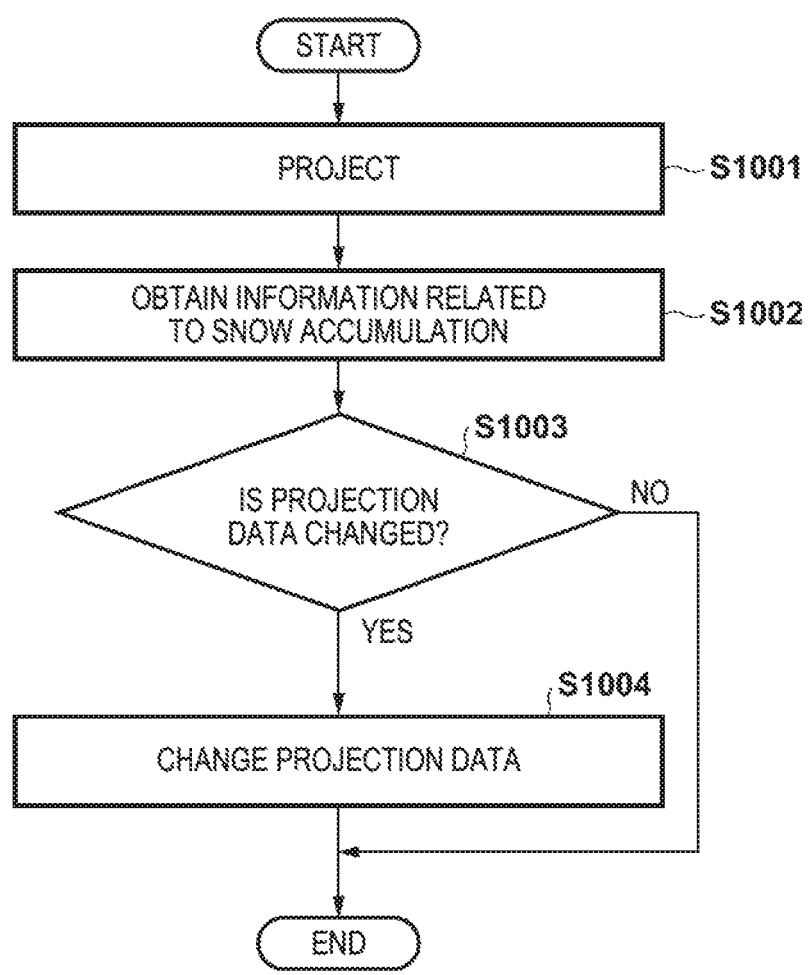

SNOWPLOW, PROJECTION METHOD FOR SNOWPLOW, STORAGE MEDIUM, AND PROJECTION SYSTEM

CROSS-REFERENCE TO RELATED APPLICATION

This application is a continuation of International Patent Application No. PCT/JP2018/012920 filed on Mar. 28, 2018, the entire disclosures of which is incorporated herein by reference.

BACKGROUND OF THE INVENTION

Field of the Invention

The present invention relates to a snowplow, a projection method for the snowplow, a storage medium, and a projection system.

Description of the Related Art

In regions with heavy snowfalls, the level of snow accumulation is also high, and snowplow's perform snow removal jobs with high frequency. Furthermore, depending on the level of snow accumulation. It is extremely difficult for the operators of snowplows to recognize roads prior to snow accumulation. In PTL 1, it is mentioned that positional coordinates of both edges of a road are measured at a certain interval with a GPS receiver in advance before a snowfall, and their GPS data is stored m as recording medium.

CITATION LIST

Patent Literature

PTL 1: Japanese Patent Laid-Open No. 2005-9238

SUMMARY OF THE INVENTION

Technical Problem

However, according to PTL 1, although it is mentioned that the positions of roads can be accurately ascertained in performing a snow removal job, it is not possible to ascertain what the topography was like before snow accumulation. It is impossible for an operator of a snowplow to know, for example, a status in which trees are planted on roadsides.

The present invention provides a snowplow that allows an operator to easily recognize a status prior to snow accumulation, a projection method for the snowplow, a storage medium, and a projection system.

Solution To Problem

The present invention in its first aspect provides a snowplow having a snow removal mechanism, the snowplow including: an obtainment unit configured to obtain topography information prior to snow accumulation; and a projection unit configured to, based on the topography information prior to snow accumulation obtained by the obtainment unit, project an image indicating the topography information prior to snow accumulation on a surface of accumulated snow that is to be removed by the snow removal mechanism.

The present invention in its second aspect provides a projection method executed on a snowplow having a snow removal mechanism, the projection method including: obtaining topography information prior to snow accumulation; and based on the obtained topography information prior to snow accumulation, projecting an image indicating the topography information prior to snow accumulation on a surface of accumulated snow that is to be removed by the snow removal mechanism.

The present invention in its third aspect provides a non-transitory computer-readable storage medium which stores a pro rat for causing a computer to operate so as to: obtain topography information prior to snow accumulation; and based on the obtained topography information prior to snow accumulation, project an image indicating the topography information prior to snow accumulation on a surface of accumulated snow that is to be removed by the snow removal mechanism of the snowplow.

The present invention in its fourth aspect provides a projection system including a snowplow having a snow removal mechanism and a server, the server including: a storage unit configured to store topography information prior to snow accumulation; a first obtainment unit configured to obtain position information from the snowplow; and a transmission unit configured to, based on the position information obtained by the first obtainment unit, transmit corresponding topography information to the snowplow, the corresponding topography information being included in the topography information prior to snow accumulation stored in the storage unit, the snowplow including: a reception unit configured to receive the corresponding topography information transmitted from the transmission unit; and a projection unit configured to, based on the corresponding topography information received by the reception unit, project an image indicating the topography information prior to snow accumulation on a surface of accumulated snow that is to be removed by the snow removal mechanism.

Advantageous Effects of Invention

The present invention enables an operator to easily recognize a status prior to snow accumulation.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 10 is a flowchart showing processing for changing projection data.

DESCRIPTION OF THE EMBODIMENTS

Figure 1:
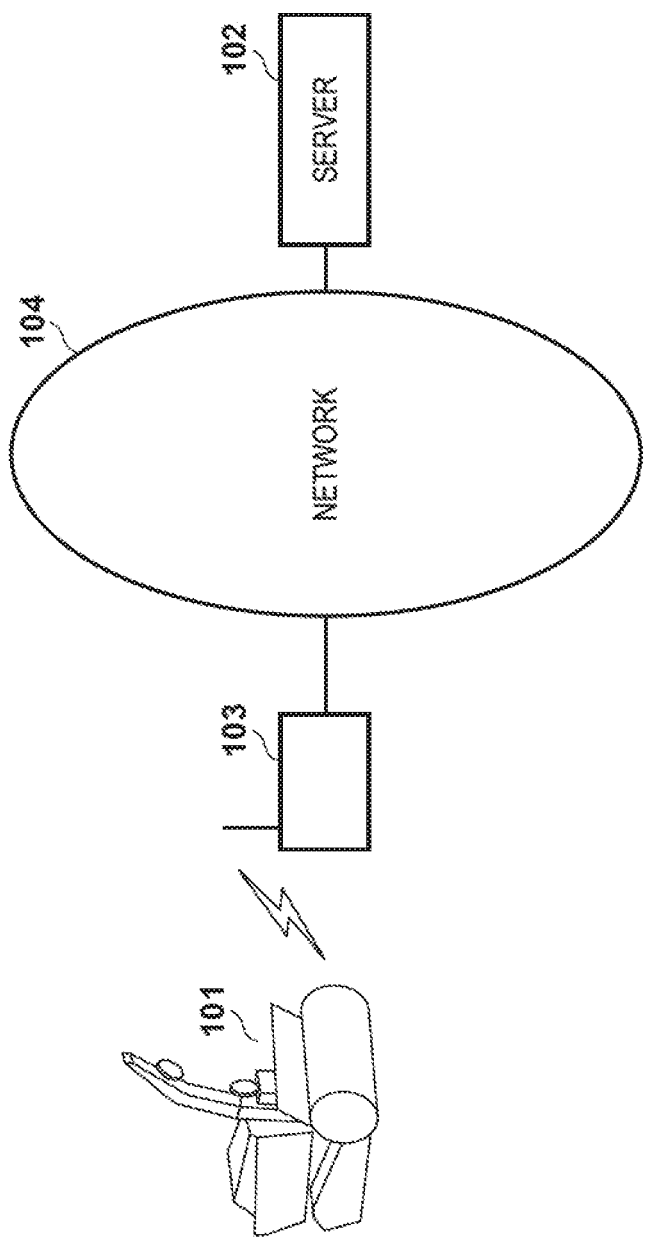
FIG. 1 is a diagram showing a configuration of a system that includes a snowplow.

Hereinafter, embodiments will be described in detail with reference to the attached drawings, Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a diagram showing a configuration of a projection system for snow removal that includes a snowplow. In the present embodiment, a snowplow 101 is communicatably connected to a server 102 via a wireless base station 103 and a network 104. Although FIG. 1 shows only one snowplow 101 and one wireless base station 103 for the sake of explanation, a plurality of snowplows and wireless base stations may be constructed, and the server 102 can communicate with, for example, snowplows 101 that exist in a plurality of different areas (e.g., mountainous areas and urban areas). In the configuration of FIG. 1, for example, the server 102 can ascertain the current position of the snowplow 101, and the snowplow 101 can obtain topography information prior to snow accumulation. For example, the snowplow 101 may obtain the topography information prior to snow accumulation from the server 102. Although not shown in FIG. 1, an apparatus and a system that allow the server 102 to obtain the topography information prior to snow accumulation are communicatably connected to the server 102. The apparatus that allows the obtainment of the topography information prior to snow accumulation is, for example, a vehicle or a drone. Also, the system that allows the obtainment of the topography information prior to snow accumulation is, for example, a road surface status management system or a GPS system. Furthermore, for example, the snowplow 101 may obtain the topography information prior to snow accumulation directly from the aforementioned vehicle, drone, and the like without the intervention of the server 102, and hold the same. In addition, the snowplow 101 may switch among the aforementioned routes by which the topography information prior to snow accumulation is obtained depending on, for example, the communication status of the network 104.

As shown in FIG. 1, the server 102 and the wireless base station 103 are configured in such a manner that they can communicate with each other via the network 104 that includes, for example, a wired or wireless medium. The snowplow 101 is configured in such a manner that it can communicate with the tireless base station 103. The wireless base station 103 is installed in, for example, a public property, such as a traffic light, and operates so as to relay data that is communicated between the snowplow 101 and the server 102. Although FIG. 1 shows the wireless base station 103 and the snowplow 101 in one-to-one correspondence for the sake of explanation, a plurality of snowplows 101 may correspond to one wireless base station 103. Note that in the following description, the operations of the wireless base station 103 are omitted when the snowplow 101 and the server 102 communicate with each other.

Figure 2:
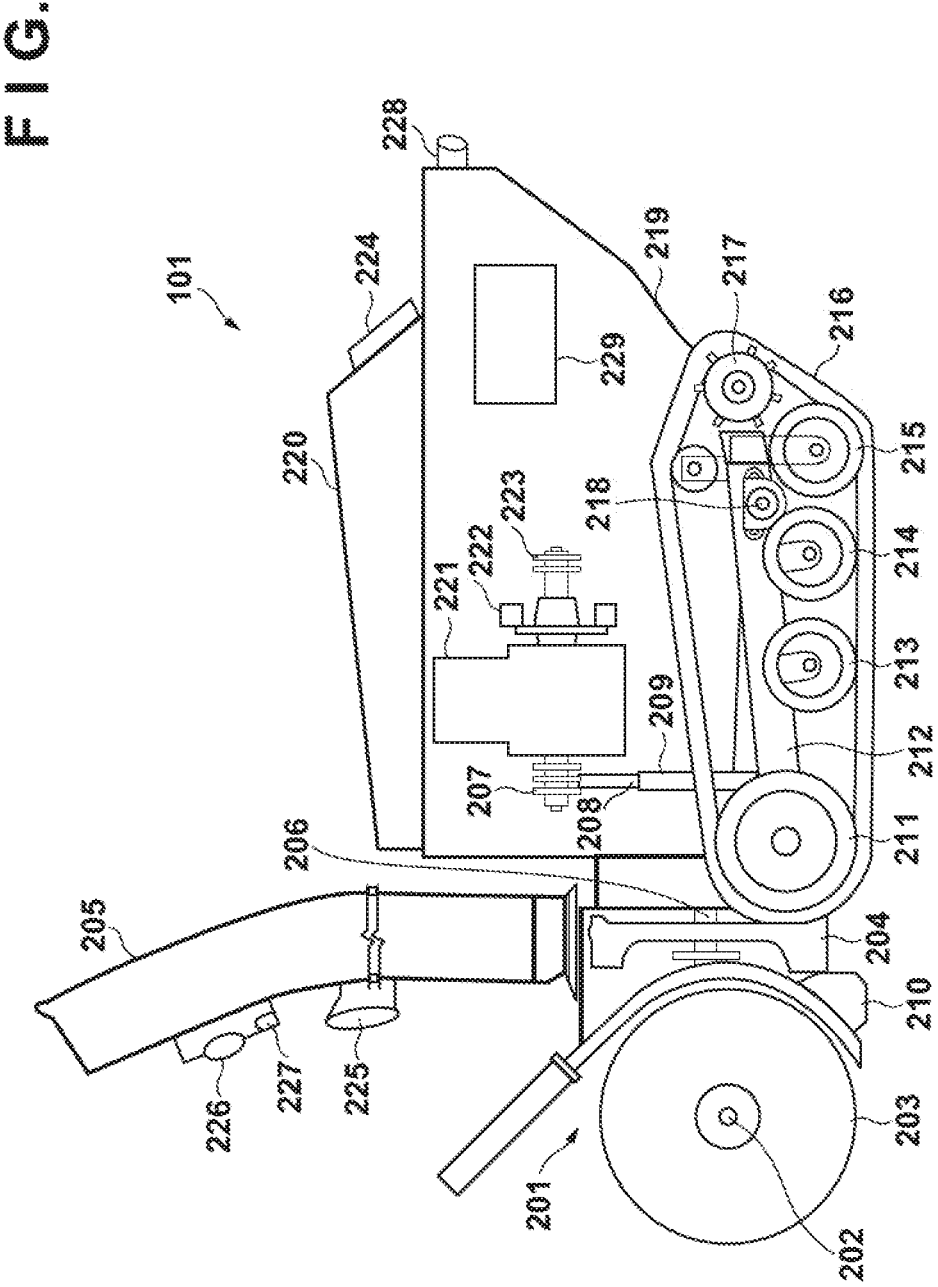
FIG. 2 is a diagram showing a configuration of the snowplow.

FIG. 2 is a diagram showing a configuration of the snowplow 101. In the present embodiment, the snowplow 101 is a crawler-type'snow removal vehicle that gathers snow with an auger and discharges snow from a chute. A description is now given of parts of a snow removal mechanism of the snowplow 101. The snowplow 101 has a snow removal unit 201, and the snow removal unit 201 includes an auger 203 for which an engine 221 is used as a drive source, a blower 204, a sledge 210, and a chute 205. The motive power of the engine 221 is transmitted to a small-diameter pulley 207, a belt 208, a large-diameter pulley 209, a drive shaft 206, and an auger shaft 202 in this order, and rotates the auger 203. While rotating, the auger 203 gathers snow on a road in the front-and-back direction of the figure and feeds the snow into the blower 204, and the snow is discharged to the outside by the centrifugal force of the blower 204 via the chute 205. The snowplow 101 also includes an engine cover 220, an engine air-cooling fan 222, and an output pulley that is connected to a drive wheel 217.

A description is now given of parts of a travel mechanism of the snowplow 101. In the snowplow 101, a vehicle body frame 219 is joined to a rear portion of a crawler frame 212 on which an idler wheel 211 is rotatably mounted at the front and three lower roller wheels 213, 214, 215 are rotatably mounted at the bottom, and the snow removal unit 201 is disposed in front of the vehicle body frame 219. The vehicle body frame 219 is joined to the crawler frame 212 by a pivot shaft 218. The drive wheel 217 is disposed on a rear portion of the vehicle body frame 219, and a crawler belt 216 is wound around and across the drive wheel 217 and the idler wheel 211; as a result, the snowplow 101 is configured as a crawler-type snow removal vehicle. Also, a headlamp 225 that can cast light ahead is attached to the snowplow 101. Furthermore, an operation unit 224 is a human-machine interface that can accept instructions for controlling respective components related to the travel mechanism, the snow removal mechanism, and the like of the snowplow 101.

In the present embodiment, the snowplow 101 further includes a control unit 229. The control unit 229 includes detection units 227, 228 that are attached to the snowplow 101 for recognizing an external environment. The detection units 227, 228 are, for example, a camera and a sensor. Also, in the present embodiment, the snowplow 101 further includes a projection unit 226. The projection unit 226 is a projector, and is attached to, for example, the chute 205. The projection unit 226 projects images on a road surface ahead, or on the surface of snow accumulated ahead. Projected images will be described later.

In the present embodiment, the snowplow 101 may be of a type that allows an operator to be aboard thereon, or may be of a type that is hand-pushed by the operator. When it is of the type that allows an operator to be aboard thereon, a boarding unit (not shown) that includes maneuver units, such as a seat, a steering wheel, and pedals, and the operation unit 224 is arranged behind the engine cover 220.

Figure 3:
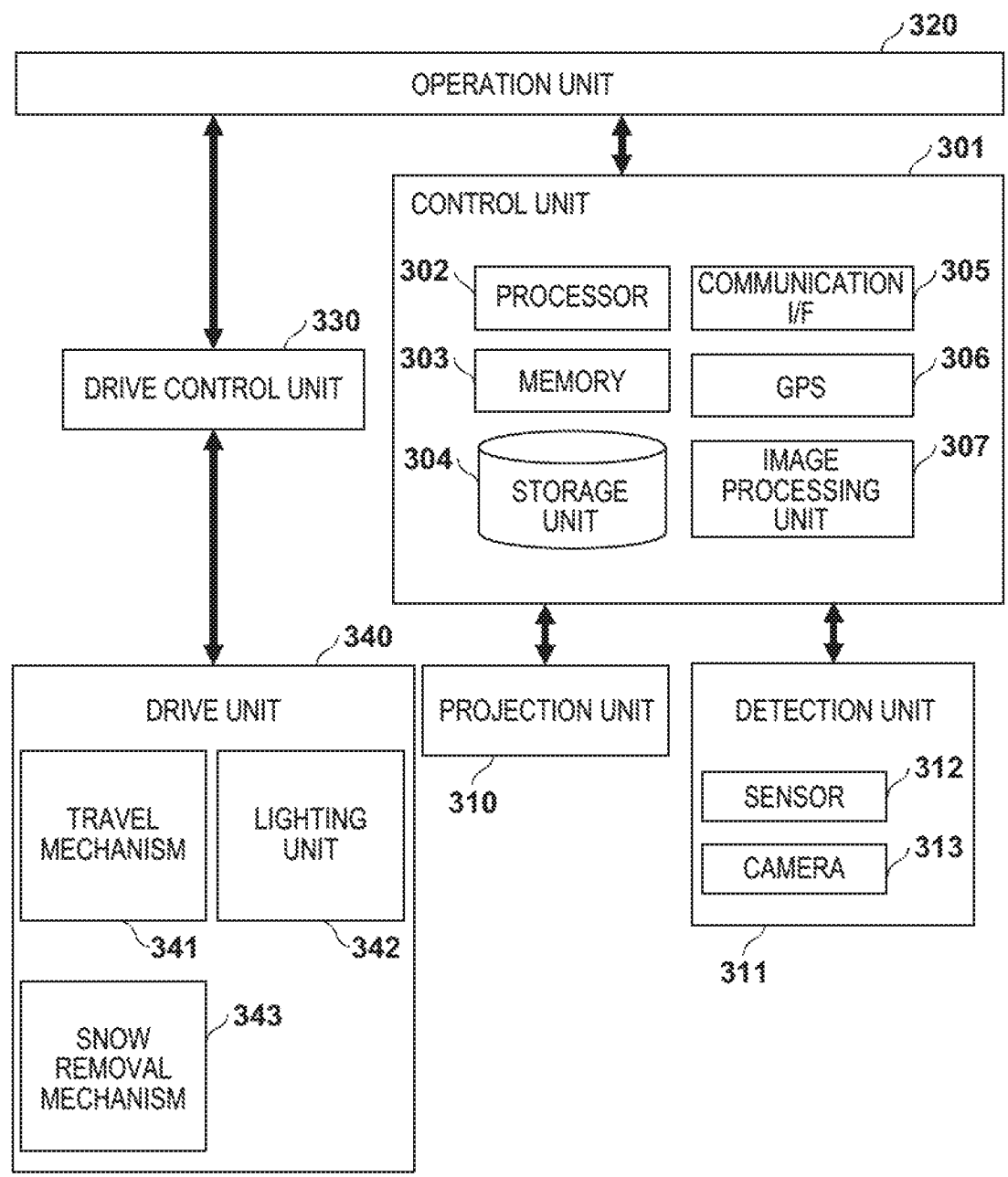
FIG. 3 is a block diagram showing the configuration of the snowplow.

FIG. 3 is a block diagram showing the configuration of the snowplow 101, A control unit 301, a projection unit 310, a detection unit 311, and an operation unit 320 of FIG. 3 correspond to the control unit 229, the projection unit 226, the detection units 227, 228, and the operation unit 224 of FIG. 2, respectively. Furthermore, a drive control unit 330 of FIG. 3 corresponds to the engine 221 of FIG. 2, a mechanism control unit (not shown) that controls mechanisms of respective components of the snowplow 101, and an electrical system control unit (not shown). A drive unit 340 includes a travel mechanism 341, a lighting unit 342, and a snow removal mechanism 343, and is controlled by the drive control unit 330. The travel mechanism 341 and the snow removal mechanism 343 correspond to components of the travel mechanism and the snow removal mechanism described using FIG. 2, respectively. The lighting unit 342 includes the headlamp 225 and a notification mechanism, such as a direction indicator (not shown).

The control unit 301 includes a processor 302, a memory 303, a storage unit 304, a communication I/F 305, a UPS 306, and an image processing unit 307. The processor 302 controls respective components of the snowplow 101 integrally in order to realize the operations of the present embodiment. The operations of the present embodiment are realized by, for example, the processor 302 reading a program stored in the storage unit 304, which is a computer-readable storage medium, into the memory 303 and executing the program. The configuration of the control unit 301 can be a computer that carries out the present invention according to the program.

The storage unit 304 stores various tees of parameters, data, and the like in addition to the aforementioned program. The communication interface (I/F) 305 includes an antenna for communicating with the wireless base station 103, and a signal format conversion unit. The control unit 301 can also perform inter-vehicle communication with a nearby snowplow 101 via the communication I/F 305. The UPS 306 is a GPS sensor, and detects the current position of the snowplow 101. The image processing unit 307 generates image data to be projected by the projection unit 310. The image processing unit 307, for example, performs image recognition with respect to photographic image data to form a pattern, and executes geometric distortion correction when a projection target surface is not a planar surface. The processor 302 controls the projection unit 310 to perform projection based on image data generated by the image processing unit 307.

A description is now given of image data projected by the projection unit 310. The snowplow 101 performs a snow removal job on the precondition that snow has been accumulated on a road. Although roads, such public properties as traffic lights, signs, buildings, and the like may exist in an area of the snow removal job, an operator may not necessarily be able to distinctively recognize the road widths, the direction of movement of the snowplow 101, and obstacles depending on the state of snow accumulation. Furthermore, there is a case where flower beds and planted trees existed immediately next to a road before snow accumulation; in this case, it is possible that these plants and the like be damaged unintentionally by the operator due to the snow removal job.

Figure 11:
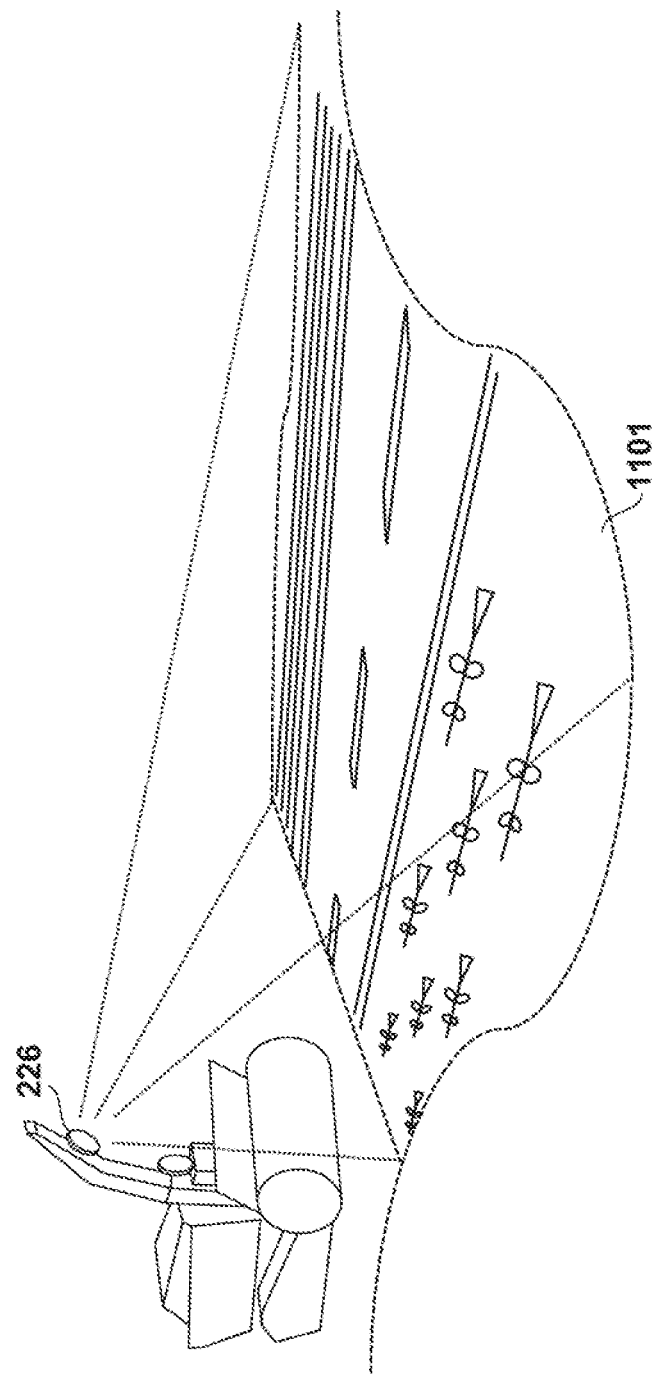
FIG. 11 is a diagram showing a state in which the snowplow is performing projection.

In the present embodiment, when the snowplow 101 travels while removing snow, an image is projected on the surface of snow accumulated ahead. FIG. 11 is a diagram showing a state in which the snowplow 101 is projecting an image 1101 on the surface of snow accumulated ahead from the projection unit 226. The image 1101 indicates that there is a road underneath the accumulated snow and a flower bed exists on the side of the road. After snow accumulation, the road and the flower bed become invisible to the operator due to the accumulated snow. However, according to the present embodiment, even in such a state, the operator can recognize a scene prior to snow accumulation thanks to the projected image, and can smoothly perform the snow removal job.

The projection unit 310 is provided so as to project on a road surface from an upper portion of the chute 205 in the manner of, for example, the projection unit 226 in FIG. 2. The image processing unit 307 generates image data so that an image is normally projected on a road surface based on the position in which and the angle by which the projection unit 310 is attached. Also, the inclination of the projection unit 310 can be adjusted in the upward, downward, leftward, and rightward directions, and is controlled by the processor 302. For example, as a projection surface gradually changes from a planar state, which is close to a road surface, to an oblique state and then a wall-like state with an increase in the height of accumulated snow, the processor 302 controls the angle of the projection unit 310 so as to suppress distortion of an image projected on the projection surface in accordance with the change.

The detection unit 311 includes a sensor 312 and a camera 313. The sensor 312 is, for example, an ultrasonic wave sensor, and can detect the state of snow accumulation, for example, the state in which snow is accumulated in the form of a hill, by detecting reflected waves of ultrasonic waves that have been radiated ahead of the snowplow 101. Also, the sensor 312 is, for example, an infrared sensor that is installed on the upper portion of the chute 205, for example, at the position of the detection unit 227 of FIG. 2, and can detect the depth of snow accumulated ahead by projecting infrared light on the surface of accumulated snow from above. Furthermore, the detection unit 311 can detect the state of snow quality, for example, whether the snow is in a state in which its density is high and the surface of accumulated snow is hard, or is in a state in which its density is low and the surface of accumulated snow is soft, based on the intensity of reflected waves. The camera 313 is a camera that captures images of an external environment, and is attached so as to be capable of capturing front-, side-, and rear-views of the snowplow 101.

The control unit 301 can detect a person, an obstacle, and the like approaching the snowplow 101 using radio waves emitted from the detection unit 311 and captured image data of the camera. The control unit 301 can also estimate a risk associated with the approach from a relative relationship between the position of the approaching person or obstacle and the position of the snowplow 101. The control unit 301 can further obtain information of the person or obstacle from the server 102. Even in a state where, for example, snow is accumulated ahead in the form of a bill, the foregoing configuration makes it possible to recognize the existence of a person or an obstacle on the other side of the accumulated snow, which is a blind spot for the operator.

Although the detection unit 311 is illustrated only at the positions of the detection units 227, 228 in FIG. 2, it is not limited to these positions. For example, it may be positioned on a side surface of the snowplow 101, in the vicinity of the headlamp 225, or on r portion near the head of the chute 205. For example, when it is attached to, a portion near the head of the chute 205, the camera can capture a distant front view showing a blind spot for the operator even if the depth of accumulated snow is approximately 2 m.

The operation unit 320 includes a steering wheel and pedals for accepting maneuver operations from the operator, an instrument panel, a panel (display unit) that displays, for example, a user interface screen related to the operations of the present embodiment, and an input unit for accepting setting operations. The user interface screen is, for example, a mode setting screen for switching among projection modes of the projection unit 310. The projection modes will be described later.

Figure 4:
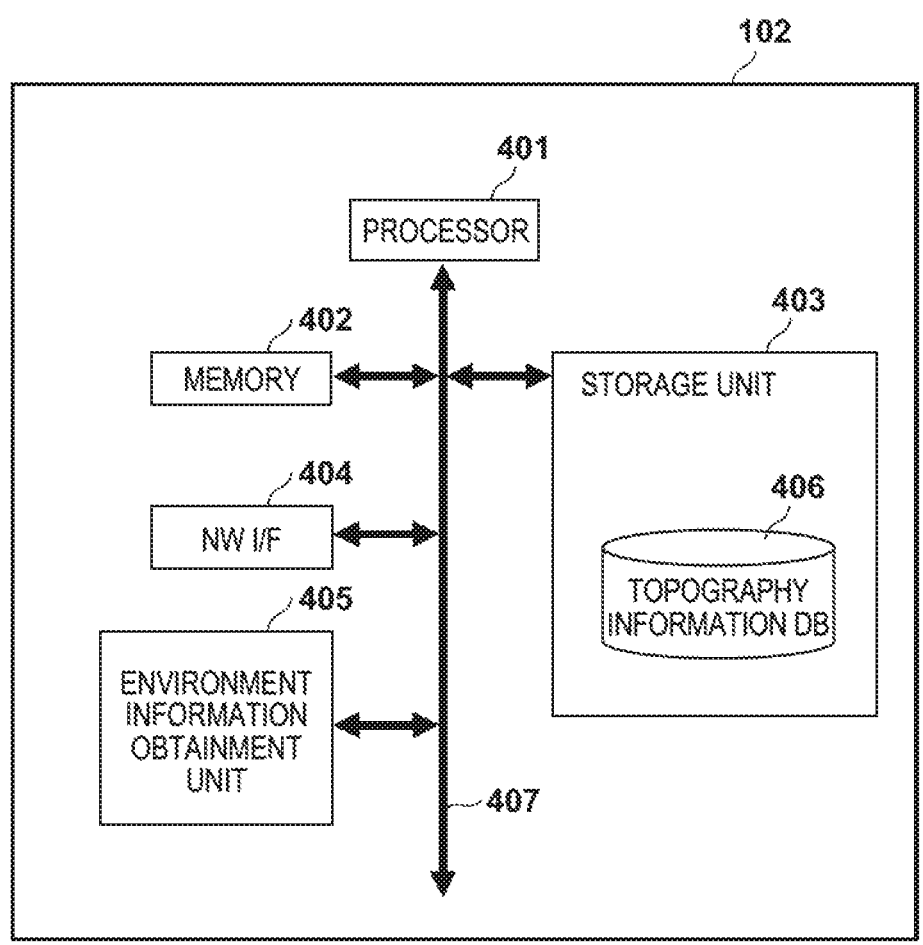
FIG. 4 is a block diagram showing a configuration of a server.

FIG. 4 is a block diagram showing a configuration of the server 102. A processor 401 controls the server 102 integrally, and realizes the operations of the present embodiment by, for example, reading a program stored in a storage unit 403, which is a computer-readable storage medium, into a memory 402 and executing the program. The server 102 can be a computer that carries out the present invention according to the program. A network interface (NW I/F) 404 is an interface for enabling communication with the network 104, and is configured in accordance with a medium of the network 104.

An environment information obtainment unit 405 obtains environment-related information, such as topography information prior to snow accumulation and information related to snow accumulation. The environment information obtainment unit 405 obtains the topography information prior to snow accumulation and the information related to snow accumulation from, for example, a drone, a road surface status sensor that is installed in the vicinity of a road, and the like. The topography information prior to snow accumulation is, for example, photographic image data that has been shot from the air before a snowfall, and the information related to snow accumulation is, for example, information related to the depth of accumulated snow, the snow quality, and the status, of freezing of a road surface. Also, the environment information obtainment unit 405 may use map attribute information stored in a map database (not shown) that is held in the storage unit 403 in advance, such as road inclination information and road width information, as the topography information together with photographic image data. Furthermore, information of a person, an obstacle, and the like existing around the snowplow 101 may be obtained as the environment-related information. The environment information obtainment unit 405 stores the obtained environment-related information into the storage unit 403. Although the server 102 is described as including the environment information obtainment unit 405 in the present embodiment, the control unit 301 of the snowplow 101 shown in FIG. 3 may include a block that has functions similar to those of the environment information obtainment unit 405. With this configuration, for example, the snowplow 101 can obtain the topography information prior to snow accumulation and the information related to snow accumulation from a drone, a road surface status sensor, and the like without the intervention of the server 102. Furthermore, each of the server 102 and the snowplow 101 may include a block that has functions similar to those of the environment information obtainment unit 405, and the snowplow 101 may switch among the routes by which the topography information prior to snow accumulation and the information related to snow accumulation are obtained depending on the communication status of the network 104.

The storage unit 403 stores the program, parameters, and data for realizing the operations of the present embodiment. Also, in the storage unit 403, a topography information database (DB) 406 is constructed based on the environment-related information obtained by the environment information obtainment unit 405. The topography information database is constructed in a form in which, for example, position information, photographic image data, and map attribute information are associated with one another. In this way, for example, photographic image data that has been shot from the air before a snowfall can be specified based on position information received from the snowplow 101. The storage unit 403 may further hold the aforementioned map database, or the processor 401 may obtain map information from another server. Respective blocks of FIG. 4 are communicatably connected to one another via a bus 407.

Figure 5:
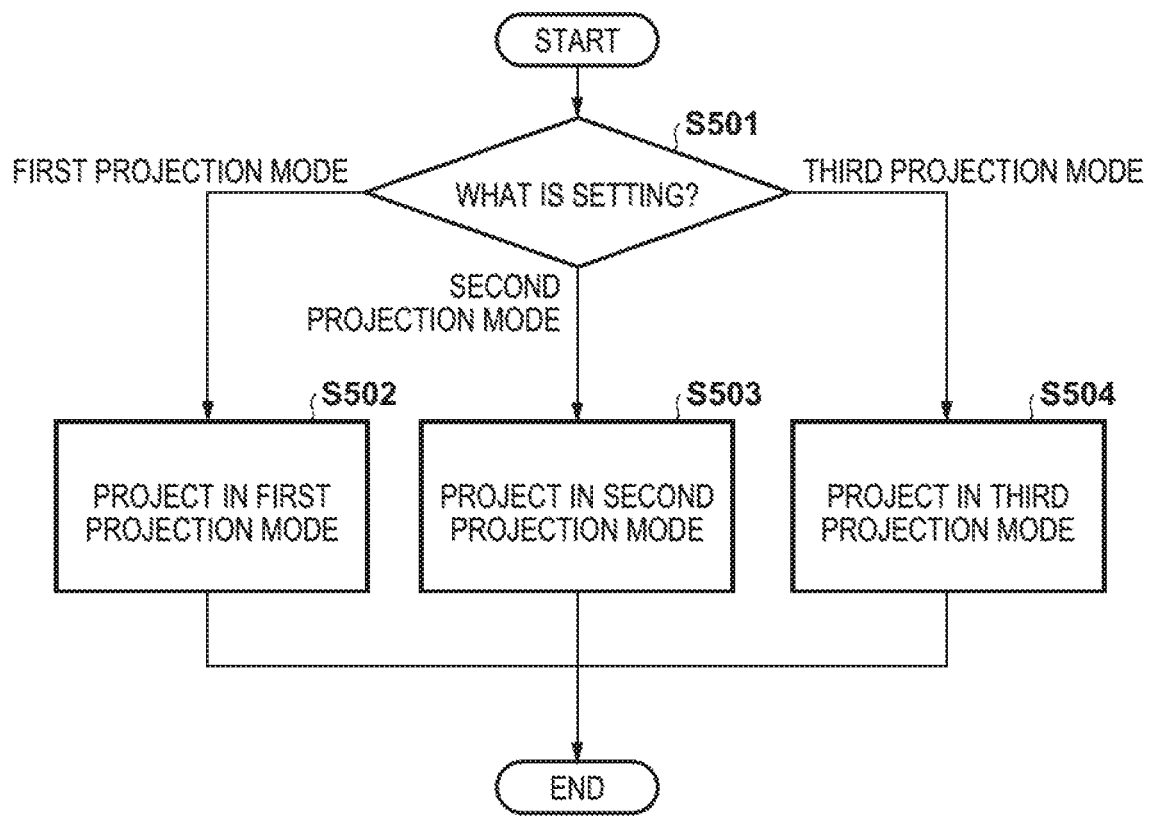
FIG. 5 is a flowchart showing processing for switching among projection modes.

FIG. 5 is a flowchart showing processing for switching among the projection modes of the projection unit 310 of the snowplow 101. In the present embodiment, there are three types of projection modes, and they can be changed based on the setting of the operator accepted on the setting screen displayed on the operation unit 320. The processing of FIG. 5 is executed when, for example, the setting has been accepted on the setting screen of the operation unit 320 from the operator.

In S501, the control unit 301 obtains setting information from the operation unit 320, and discerns the content of the setting of a projection mode. Here, when a "first projection mode" has been set as the projection mode, processing proceeds to S502, and the control unit 301 controls respective components so that projection is performed in the first projection mode. When a "second projection mode" has been set as the projection mode, processing proceeds to S503, and the control unit 301 controls respective components so that projection is performed in the second projection mode. When a "third projection mode" has been set as the projection mode, processing proceeds to S504, and the control unit 301 controls respective components so that projection is performed in the third projection mode. After S502 to S504, the processing of FIG. 5 is ended.

Figure 6:
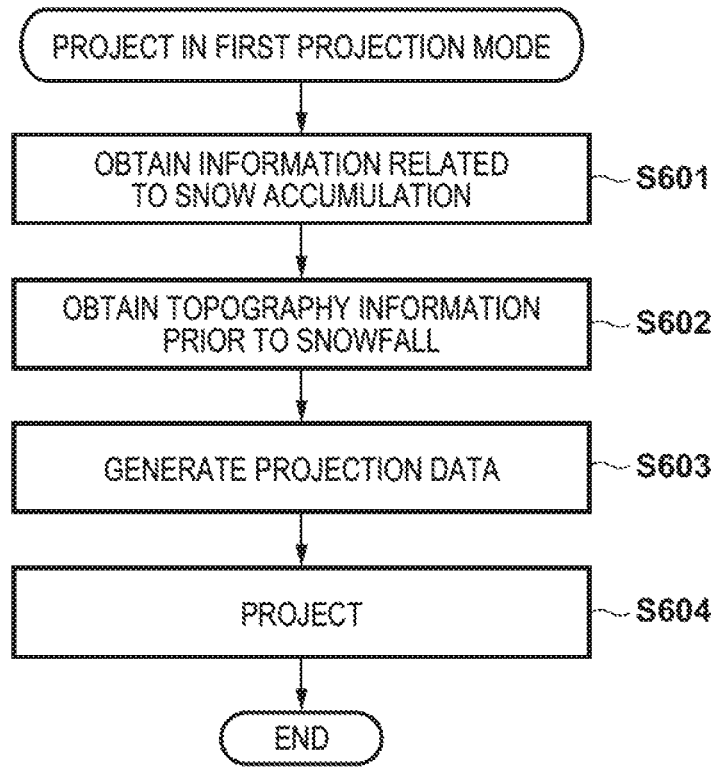
FIG. 6 is a flowchart showing projection processing in a first projection mode.

FIG. 6 is a flowchart showing the processing of S502. In the present embodiment, the first projection mode is a mode in which the projection unit 310 projects topography information prior to snow accumulation. The topography information prior to snow accumulation mentioned here is, in other words, an image that shows a scene prior to snow accumulation. In S601, in order to recognize the shape of a projection target surface, the control unit 301 obtains information related to snow accumulation from the detection unit 311. The information related to snow accumulation is, for example, the depth of accumulated snow.

In S602, the control unit 301 obtains topography information prior to snow accumulation from the server 102 via the communication I/F 305. Note that the snowplow 101 periodically transmits position information that has been detected by the GPS 306 to the server 102. The cycle of this transmission may be determined based on the travel speed of the snowplow 101. Based on the position information of the snowplow 101, the processor 401 of the server 102 obtains image data prior to snow accumulation, which was stored into the topography information DB 406 of the storage unit 403 in advance before snow accumulation, and transmits the same to the snowplow 101.

In S603, the control unit 301 generates projection data based on the image data obtained in S602. The projection data may be data corresponding to the obtained image data, such as photographic image data from the air, or may be image data that represents a simplified form of the photographic image data. For example, conversion into a pattern image, such as the image 1101, may be performed when in an area in which flower beds and planted trees exist on the side of a road.

Based on the information related to snow accumulation obtained in S601, the control unit 301 recognizes the shape of the surface of accumulated snow that is to be the projection target surface. The control unit 301 generates the projection data by correcting the image data so that an image is projected normally along the recognized shape of the surface of accumulated snow. This correction of the image data is, for example, geometric distortion correction, such as keystone distortion correction. Furthermore, if the change in topographical relief of the surface of accumulated snow that is to be the projection target surface recognized by the control unit 301 is equal to or smaller than a threshold, the surface of accumulated snow may be regarded as a planar surface. The change in topographical relief of the surface of accumulated snow may be obtained from, for example, the result of scanning the surface of snow accumulated ahead, in the width direction of the snowplow 101, using the detection unit 227 attached to the front of the snowplow 101. In S604, the control unit 301 controls the projection unit 310 so that projection is performed based on the projection data generated in S603. Thereafter, the processing of FIG. 6 is ended.

Figure 12:
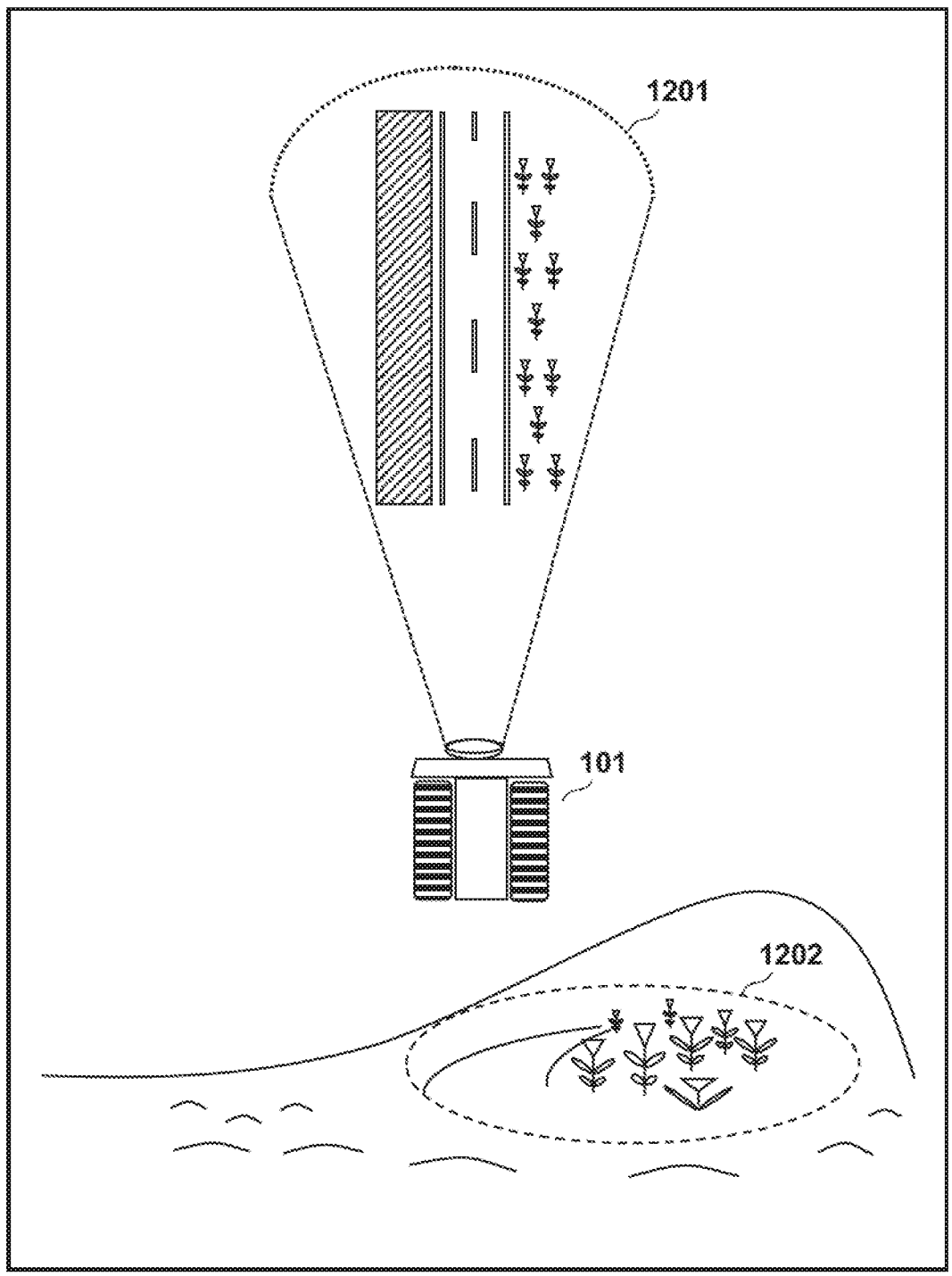
FIG. 12 is a diagram showing a state in which projection is performed in the first projection mode.

FIG. 12 is a diagram showing a state in which projection is performed in the first projection mode. The upper level of FIG. 12 is a diagram of a state in which an image 1201 has been projected on the surface of snow accumulated ahead as viewed from above the snowplow 101, when the change in topographical relief of the surface of accumulated snow is equal to or smaller than the threshold. This projection enables the operator to know that a flower bed exists on the right side of a road, and to perform a snow removal job while taking care not to damage the flower bed.

On the other hand, the lower level of FIG. 12 is a diagram showing a state in which the change in topographical relief of the surface of accumulated snow is larger than the threshold and, for example, snow is accumulated in the form of an approximately two-meter hill on the right side in the moving direction of the snowplow 101 as viewed from the eyes of the operator. In this case, an image 1202 is projected on the surface of snow accumulated in the form of the hill. In this case, projection is performed to realize (enable) stereoscopic viewing by making use of a spherical portion of the surface of snow accumulated in the form of the hill, in the manner of the image 1202. For example, the control unit 301 generates an image corresponding to the viewpoint of the operator from the image 1201 corresponding to an aerial viewpoint, and generates projection data by making contrast adjustment in line with the shape of the surface of accumulated snow. The projection of FIG. 12 enables the operator to perform a snow removal job while recognizing the state prior to snow accumulation, regardless of the state of snow accumulation. Furthermore, a travel road of the snowplow 101 may be identifiable on an image projected in the first projection mode. For example, different colors may be used to make the road identifiable in FIG. 12.

Figure 7:
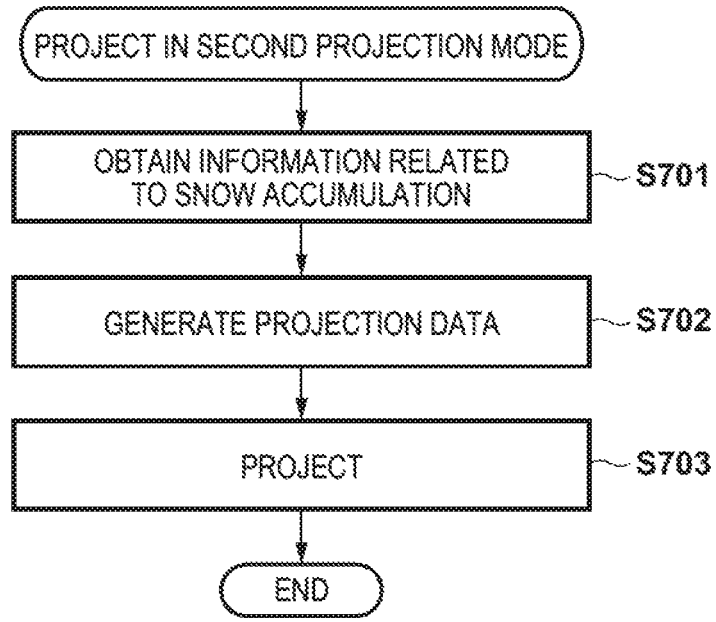
FIG. 7 is a flowchart showing projection processing in a second projection mode.

FIG. 7 is a flowchart showing the processing of S503. In the present embodiment, the second projection mode is a mode in which the projection unit 310 projects information related to snow accumulation. In S701, in order to recognize the shape of a projection target surface, the control mint 301 obtains information related to snow accumulation from the detection unit 311. The information related to snow accumulation is, for example, the depth of accumulated snow.

In S702, the control unit 301 generates projection data based on the information related to snow accumulation obtained in S701. The projection data is, for example, a contour map that indicates the distribution of the depth of accumulated snow using contour lines. Then, based on the information related to snow accumulation obtained in S701, the control unit 301 recognizes the shape of the surface of accumulated snow that is to be the projection target surface.

The control unit 301 generates the projection data by correcting image data so that an image is projected normally along the recognized shape of the surface of accumulated snow. This correction of the image data is, for example, geometric distortion correction, such as keystone distortion correction. Furthermore, if the change in topographical relief of the surface of accumulated snow that is to be the projection target surface recognized by the control unit 301 is equal to or smaller than the threshold, the surface of accumulated snow may be regarded as a planar surface. In S703, the control unit 301 controls the projection unit 310 so that projection is performed based on the projection data generated in S702. Thereafter, the processing of FIG. 7 is ended.

Figure 13:
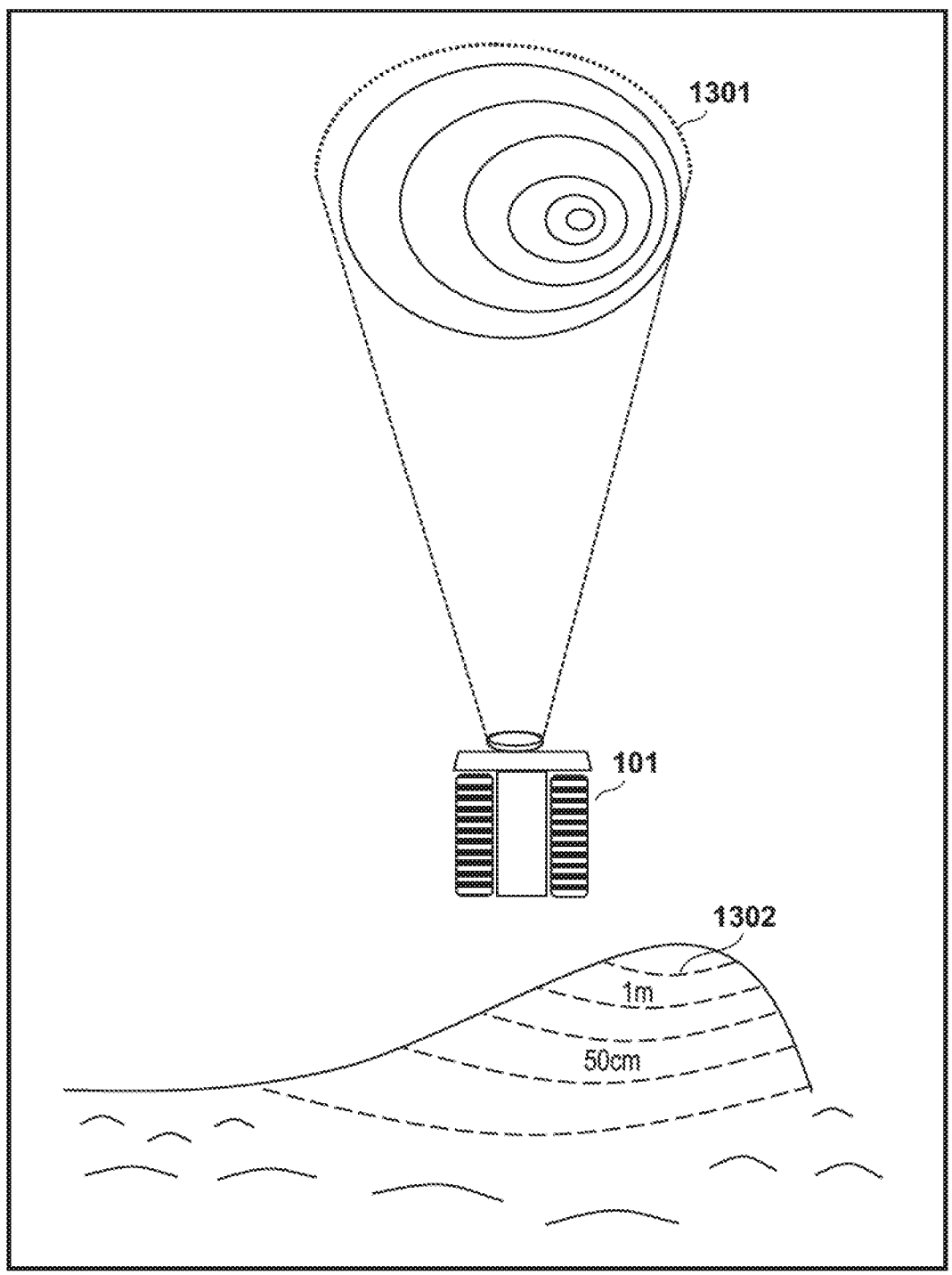
FIG. 13 is a diagram showing a state in which projection is performed in the second projection mode.

FIG. 13 is a diagram showing a state in which projection is performed in the second projection mode. The upper level of FIG. 13 is a diagram of a state in which an image 1301 has been projected on the surface of snow accumulated ahead, as viewed from above the snowplow 101, when the change in topographical relief of the surface of accumulated snow is equal to or smaller than the threshold. This projection enables the operator to know that the right side of a road has been raised due to snow accumulation, and smoothly proceed with maneuvering of the snowplow 101 and a snow removal job while taking the state of snow accumulation into consideration. The recessed/projecting states of the surface of accumulated snow are hard to see, especially during the night. With the configuration of the present embodiment, as projection is performed on the surface of accumulated snow, the operator can easily recognize the recessed/projecting states of the surface of accumulated snow even during the night.

On the other hand, the lower level of FIG. 13 is a diagram showing a state in which the change in topographical relief of the surface of accumulated snow is larger than the threshold and, for example, snow is accumulated in the form of an approximately two-meter hill on the right side in the moving direction of the snowplow 101 as viewed from the eyes of the operator. In this case, an image 1302 is projected on the surface of snow accumulated in the form of the hill. Although an image showing a contour map is projected in FIG. 13, other images may be projected as long as they indicate the depth of accumulated snow. For example, color-based distinction may be made by projecting a section corresponding to a greater depth of snow accumulation in red, projecting a section corresponding to a smaller depth of snow accumulation in blue, and so forth. Furthermore, a warning may be displayed by projecting only a section corresponding to a recess in red. The projection of FIG. 13 enables the operator to perform a snow removal job while recognizing the recesses/projections on the surface of accumulated snow.

Figure 14:
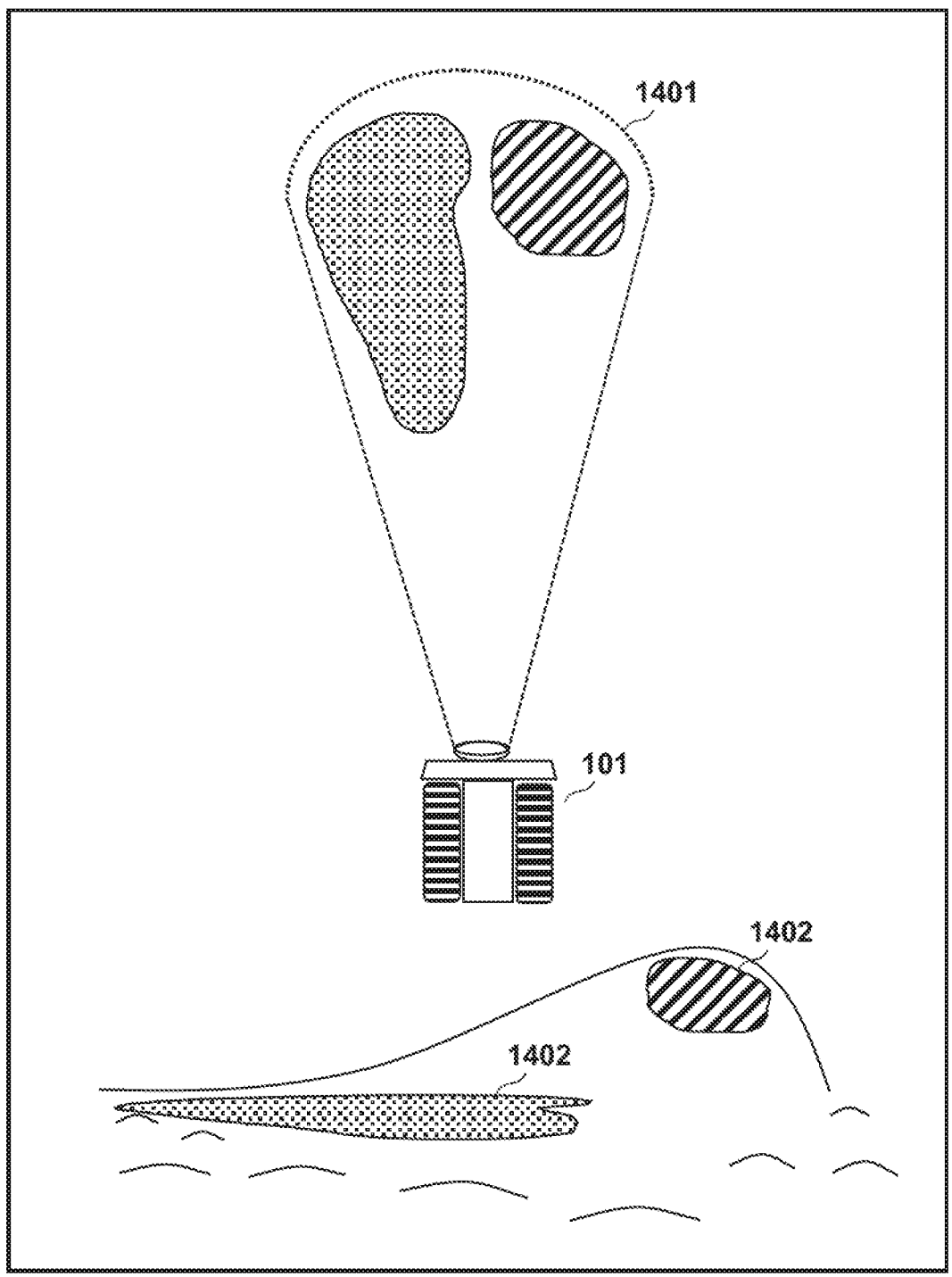
FIG. 14 is a diagram showing a state in which projection is performed in the second projection mode.

In the foregoing, the depth of accumulated snow is used as the information related to snow accumulation, and projection data that allows the recesses/projections on the surface of accumulated snow to be recognized is projected. However, the information related to snow accumulation may be the snow quality, instead of the depth of accumulated snow. FIG. 14 is a diagram showing another state in which projection is performed in the second projection mode. The upper level of FIG. 14 is a diagram of a state in which an image 1401 has been projected on the surface of snow accumulated ahead, as viewed from above the snowplow 101, when the change in topographical relief of the surface of accumulated snow is equal to or smaller than the threshold. On the other hand, the lower level of FIG. 14 is a diagram showing a state in which an image 1402 has been projected on the surface of accumulated snow, as viewed from the eyes of the operator, when the change in topographical relief of the surface of accumulated snow is larger than the threshold. The projection of FIG. 14 enables the operator to know that the snow quality is hard on the right side of a road and the snow quality is soft on the left side of the road, and smoothly proceed with maneuvering of the snowplow 101 and a snow removal job while taking the snow quality into consideration. Foo example, there may be a case where icicles that have fallen from roofs, electric wires, and the like, as well as large ice blocks that have frozen near rain gutters and fallen, are buried in the accumulated snow. If the operator of the snowplow 101 performs a snow removal job without noticing their existence, there is a risk that the auger 203 will break. However, with the projection of FIG. 14, the operator of the snowplow 101 can notice the possible existence of icicles and ice blocks in the accumulated snow, and the auger 203 can be prevented from breaking. Other than the projection of FIG. 14, an image indicating the snow quality may be projected together with an image indicating the depth of accumulated snow.

Figure 8:
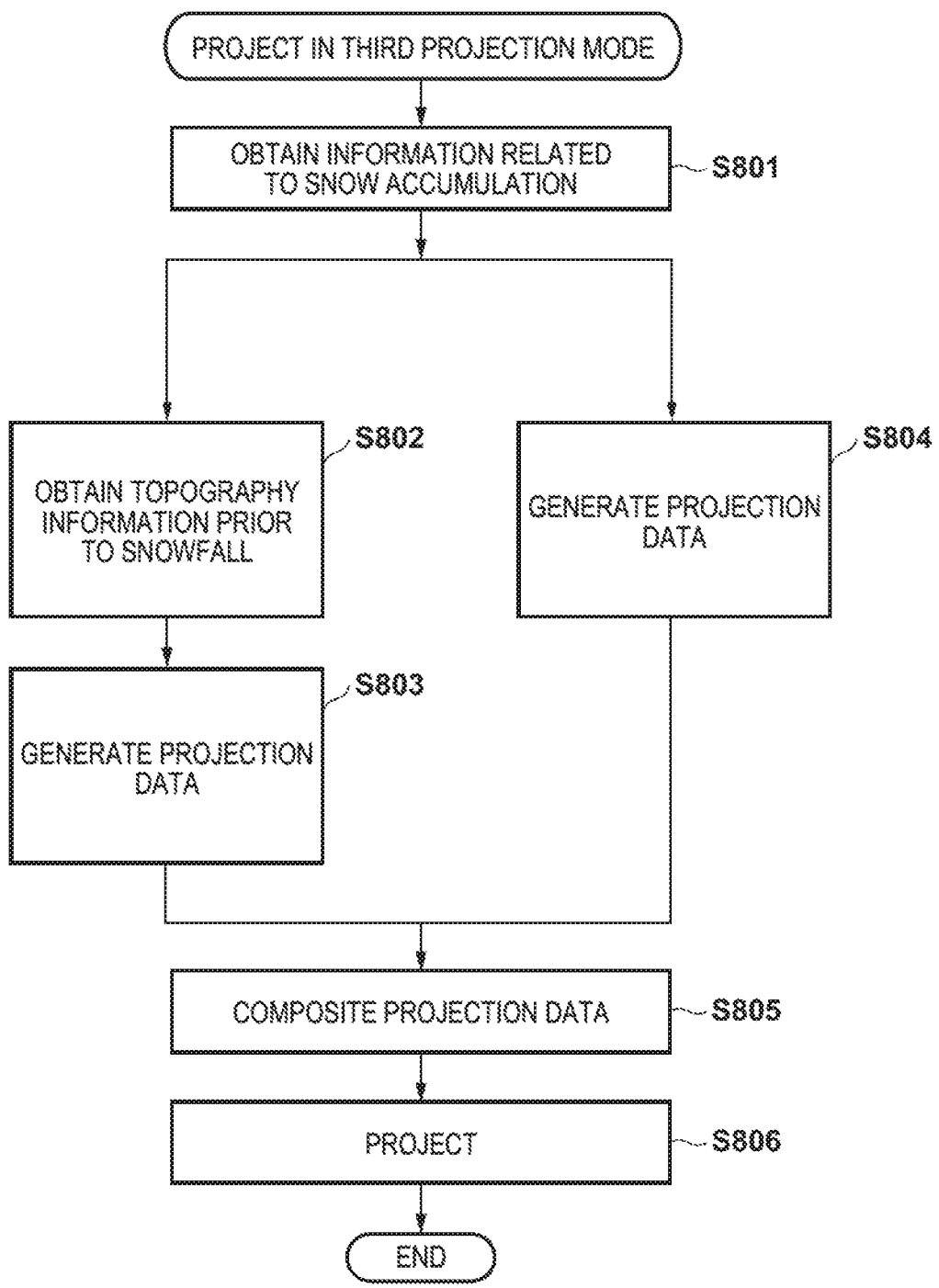
FIG. 8 is a flowchart showing projection processing in a third projection mode.

FIG. 8 is a flowchart showing the processing of S504. In the present embodiment, the third projection mode is a mode in which an image according to the first projection mode and an image according to the second projection mode, which have been described above, are projected in a superimposed manner. In S801, in order to recognize the shape of a projection target surface, the control unit 301 obtains information related to snow accumulation from the detection unit 311. The information related to snow accumulation is, for example, the depth of accumulated snow.

As S802 and S803 are the same as S602 and S603 that have been described using FIG. 6, their descriptions are omitted. As S804 is the same as S702 that has been described using FIG. 6, its description is omitted.

In S805, the control unit 301 composites together the projection data generated in S803 and the projection data generated in S804 by superimposing them. At this time, based on the information related to snow accumulation obtained in S801, the control unit 301 recognizes the shape of the surface of accumulated snow that is to be the projection target surface. The control unit 301 generates the projection data by correcting image data so that an image is projected normally along the recognized shape of the surface of accumulated snow. This correction of the image data is, for example, geometric distortion correction, such as keystone distortion correction. Furthermore, if the change in topographical relief of the surface of accumulated snow that is to be the projection target surface recognized by the control unit 301 is equal to or smaller than the threshold, the surface of accumulated snow may be regarded as a planar surface. In S806, the control unit 301 controls the projection unit 310 so that projection is performed based on the projection data generated in S805. Thereafter, the processing of FIG. 8 is ended.

Figure 15:
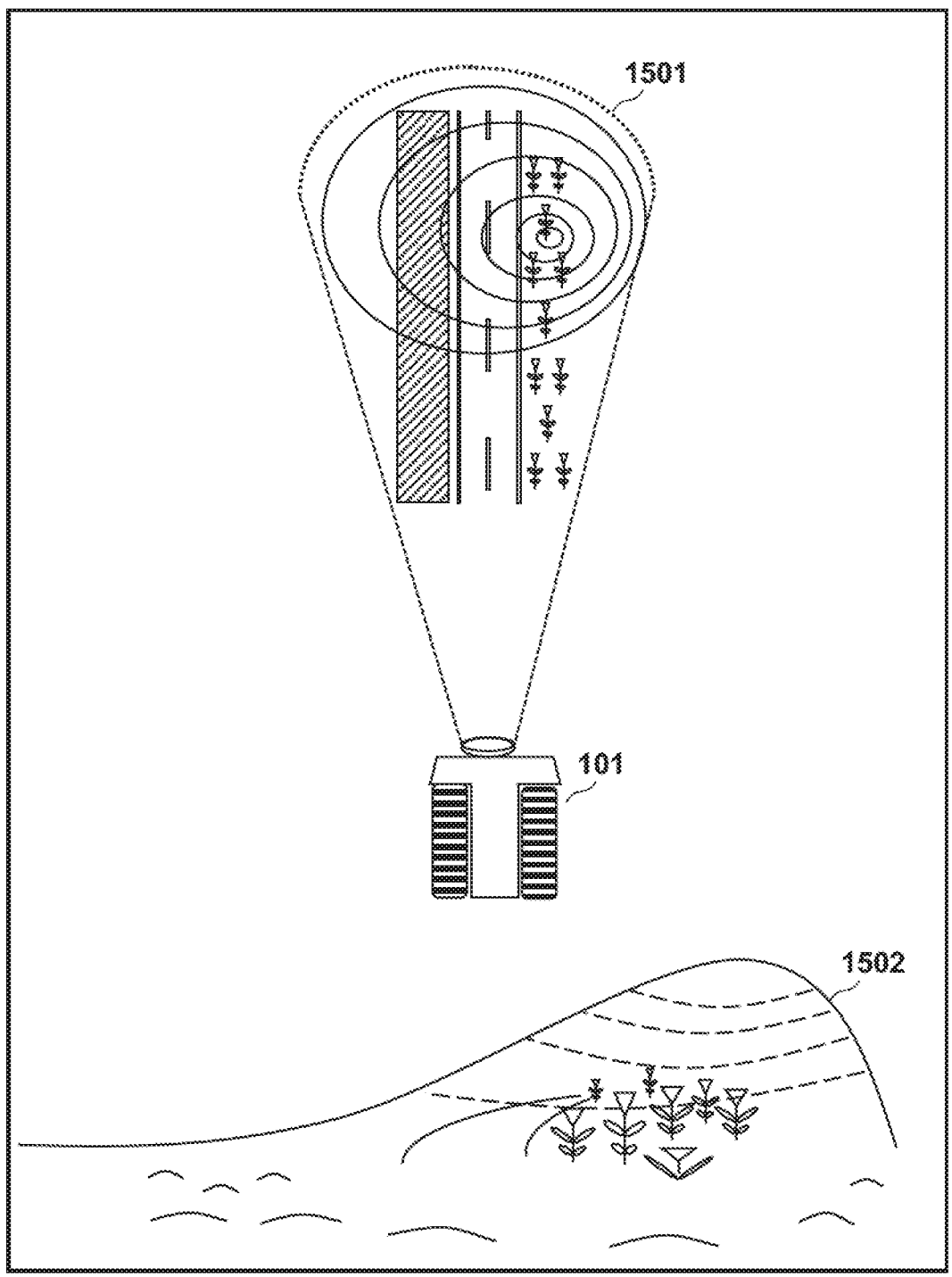
FIG. 15 is a diagram showing a state in which projection is performed in the third projection mode.

FIG. 15 is a diagram showing a state in which projection is performed in the third projection mode. The upper level of FIG. 15 is a diagram of a state in which an image 1501 has been projected on the surface of snow accumulated ahead, as viewed from above the snowplow 101, when the change in topographical relief of the surface of accumulated snow is equal to or smaller than the threshold. This projection enables the operator to blow that a flower bed exists on the right side of a road, and to further know that the right side of the road has been raised due to snow accumulation.

On the other hand, the lower level of FIG. 15 is a diagram showing a state in which the change in topographical relief of the surface of accumulated snow is larger than the threshold and, for example, snow is accumulated in the form of an approximately two-meter hill on the right side in the moving direction of the snowplow 101 as viewed from the eyes of the operator. In this case, an image 1502 is projected on the surface of snow accumulated in the form of the hill. In this case, projection may be performed to realize stereoscopic viewing of the image generated in S803 by making use of a spherical portion of the surface of snow accumulated in the form of the hill. In this case, for example, the control unit 301 generates an image corresponding to the viewpoint of the operator from an image corresponding to an aerial viewpoint, and generates projection data by making contrast adjustment in line with the shape of the surface of accumulated snow. The projection of FIG. 15 enables the operator to recognize the state prior to snow accumulation and the state of snow accumulation more intuitively.

The foregoing has described the first projection mode, the second projection mode, and the third projection mode. The operator can switch among the foregoing first projection mode, second projection mode, and third projection mode on the setting screen displayed on the operation unit 320 while the snowplow 101 is traveling. For example, when the operator has set the third projection mode on the setting screen while traveling in the first projection mode, the sets of processing of FIG. 5 and FIG. 8 are executed.

It has been mentioned that the generation and composition of projection data are performed by the control unit 301 in S603, S702, S803, S804, and S805 described above. However, the generation and composition of projection data may be performed by the server 102. In this case, the processor 401 of the server 102 performs the foregoing image recognition and generation of a pattern image. Also, the processor 401 of the server 102 may transmit only the feature amounts of photographic image data to the snowplow 101, and the control unit 301 of the snowplow 101 may generate a pattern image based on the feature amounts. Furthermore, one of the above-described sets of processing may be selectively executed depending on the status of communication between the snowplow 101 and the wireless base station 103 and the communication status of the network 104.

The following describes other projection modes. For example, if a person or an obstacle approaches from the surroundings when the snowplow 101 is performing a snow removal job, the operator needs to notice the same in order to avoid a risk. In this case, projection data is changed, and the operator is notified, via projection, of a warning indicating that a person or an obstacle is approaching. During a snow removal job with the snowplow 101, even if a person or an obstacle approaches, the operator is less likely to notice such approach because of sounds of the snow removal job. However, with a configuration that gives notification of a warning by changing projection data, the operator is given a visual reminder, and the operator can easily notice an approaching person or obstacle.

Figure 9:
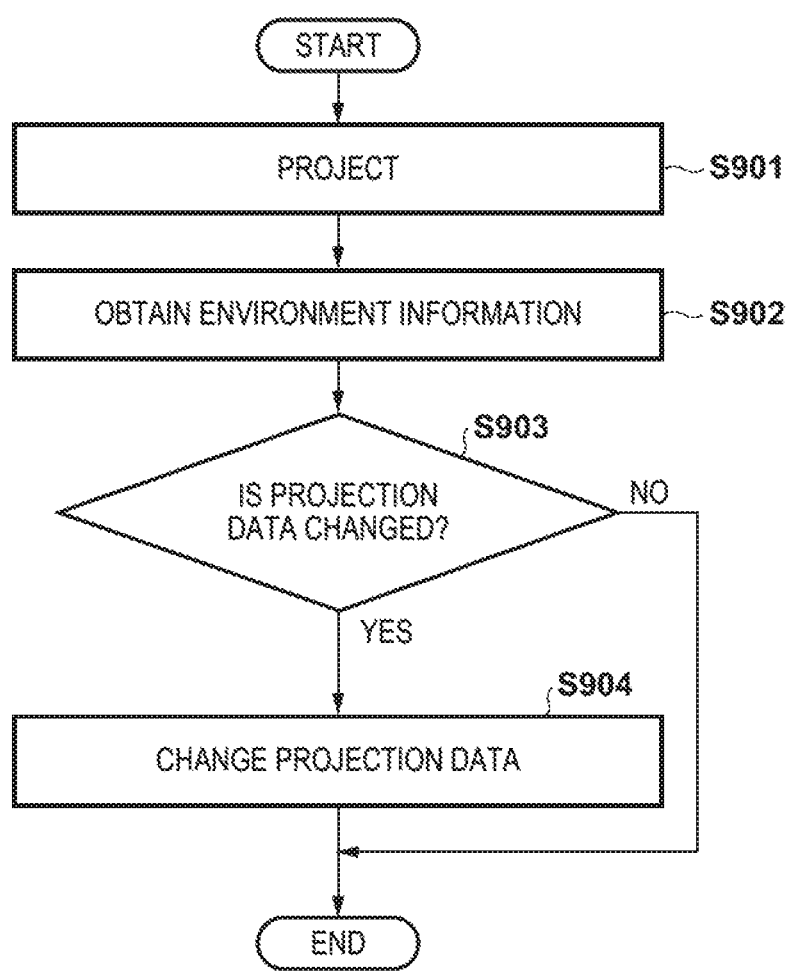
FIG. 9 is a flowchart showing processing for changing projection data.

FIG. 9 is a flowchart showing processing for changing projection data. In S901, the control unit 301 is performing projection in one of the first projection mode to the third projection mode. That is to say at the time of S901, projection and a snow removal job are being performed.

In S902, the control unit 302 obtains environment information. The environment information mentioned here is information of an approaching object, such as a person and an obstacle. The control unit 302 may obtain the environment information from the detection unit 311, or may receive the environment information from the server 102. Alternatively, both of such obtainment and reception may be performed. When the environment information can be obtained from the server 102, the operator can be notified of a warning even if a person or an obstacle has approached from the direction of a blind spot for the snowplow 101.

In S903, the control unit 302 determines whether to change projection data. For example, when the risk of the object approaching, the snowplow 101 is judged to be high, the control unit 302 determines to change the projection data, and when the risk is judged to be low, the control unit 302 determines not to change the projection data. The risk may be determined based on, for example, the extent at which the routes of movement overlap, which is obtained from the moving direction and speed of the approaching object and the moving direction and speed of the snowplow 101. Furthermore, this determination may be made in consideration of the direction in which snow is discharged from the chute 205 of the snowplow 101. For example, even when the risk can be judged to be low based on the aforementioned extent at which the routes of movement overlap, if the snow discharged from the chute 205 scatters across a wide range and the approaching object overlaps an area of snow discharge (e.g., estimated as an area having a shape of a circular sector), the risk of the approaching object is judged to be high.

When it is determined that the projection data is not to be changed in S903, the processing of FIG. 9 is ended, and the current projection and snow removal job are continued. On the other hand, when it is determined that the projection data is to be changed, the control unit 302 suspends the current projection mode and changes the projection data to projection data for a warning notification mode in S904.

Figure 16:
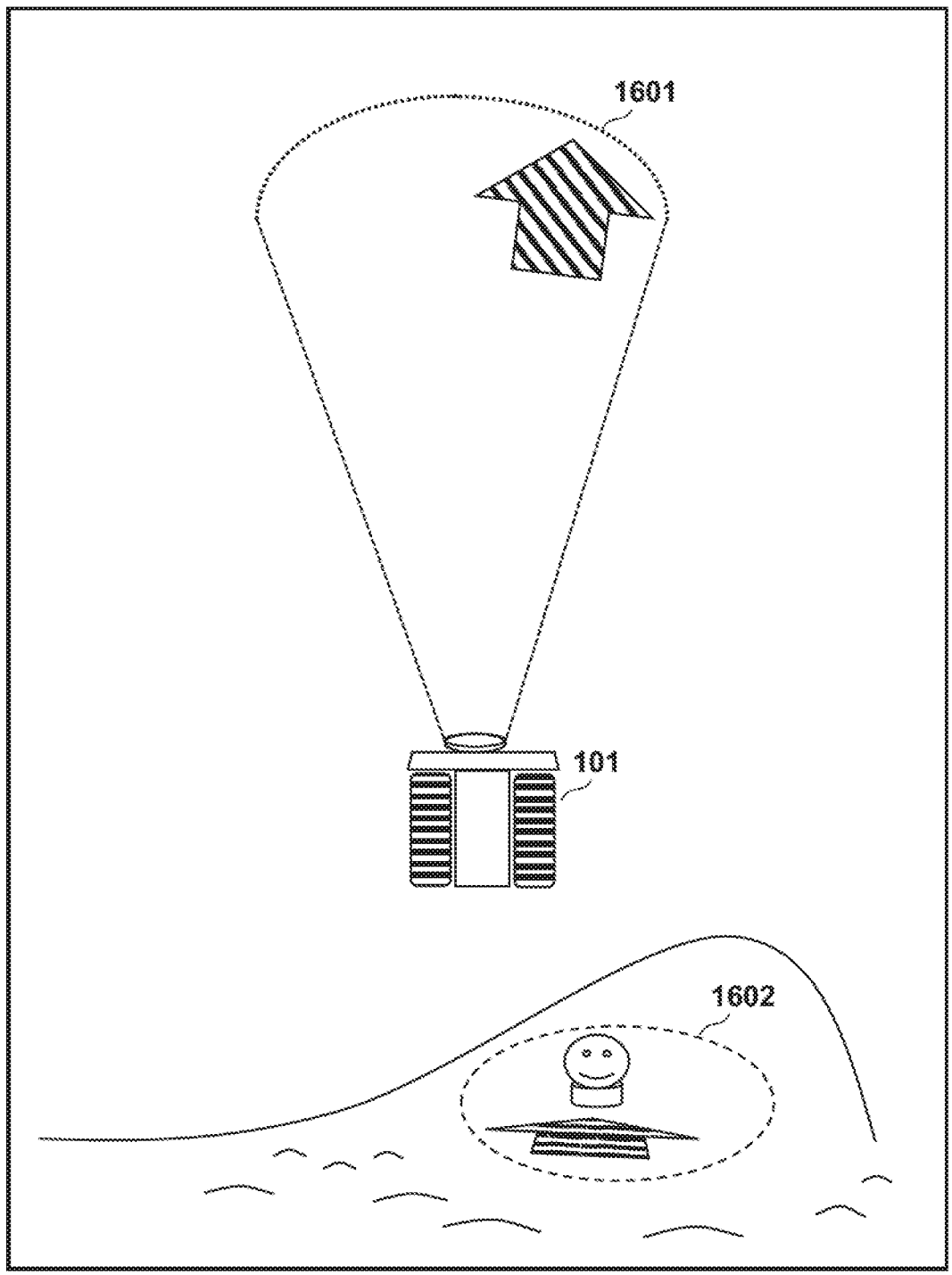
FIG. 16 is a diagram showing a state in which projection is performed in a warning mode.

FIG. 16 is a diagram showing a state in which projection is performed in the warning notification mode. The upper level of FIG. 16 is a diagram of a state in which an image 1601 has been projected on the surface of snow accumulated ahead, as viewed from above the snowplow 101, when the change in topographical relief of the surface of accumulated snow is equal to or smaller than the threshold. This projection makes it possible to provide the operator with a warning indicating that a person or an obstacle is approaching ahead on the right side of a road. On the other hand, the lower level of FIG. 16 is a diagram showing a state in which the change in topographical relief of the surface of accumulated snow is larger than the threshold and, for example, snow is accumulated in the form of an approximately two-meter hill on the right side in the moving direction of the snowplow 101 as viewed from the eyes of the operator. In this case, an image 1602 is projected on the surface of snow accumulated in the form of the hill. In this case, projection may be performed to realize stereoscopic viewing by making use of a spherical portion of the surface of show accumulated in the form of the bill, in the manner of the image 1602. Also, the image may be changed depending on the type of the approaching object, such as a person and a tree. Furthermore, especially when the approaching object is a person, an image with an outer appearance that is not recognized as a person, such as an image of a monster, is projected. This projection can prevent a situation in which, during a job, the operator is surprised at a sudden appearance of a person and brings the snowplow 101 to an emergency stop. The projection of FIG. 16 makes it possible to notify the operator of a warning indicating an approaching person or obstacle, regardless of the state of snow accumulation.

In a case where another snowplow is traveling nearby, when it is determined that the projection data is to be changed in the aforementioned S903, another snowplow may be notified of the existence of the approaching object via inter-vehicle communication, along with the changing of the projection data in S904. Furthermore, a notification about the existence of the snowplow 101 may be provided to the surroundings by, for example, flashing the headlamp 225 and projecting a color on the snow discharged from the chute 205, along with the changing of the projection data in S904.

The foregoing has described the projection mode that gives notification of a warning about an object approaching the snowplow 101. However the processing of S902 may be detection of the occurrence of a predetermined event, instead of obtainment of the environment information. For example, when there is a telephone or radio call to the operator of the snowplow 101, a pattern image of a telephone may be projected, instead of an image of an arrow, in the images 1601 and 1602 of FIG. 16. This configuration enables the operator to notice the incoming telephone or radio call, even in a situation where a ringtone is hard to hear due to sounds of the job performed by the snowplow 101.

In FIG. 9, when projection data is changed in S904, for example, projection data for projecting the image 1202 in the lower level of FIG. 12 is changed to projection data for projecting the image 1602 in the lower level of FIG. 16. However, changing of projection data is not limited to this configuration (switching between pieces of projection data), and another configuration may be adopted. For example, the image 1602 in the lower level of FIG. 16 may be superimposed on the image 1202 in the lower level of FIG. 12. In this case, for example, an object indicating an approaching object (e.g., the aforementioned monster) may be displayed in a flashing or other highlighted state, so as not to make it difficult to distinguish the object indicating the approaching object.

The following describes a configuration that changes projection data based on information related to snow accumulation.

FIG. 10 is a flowchart showing processing for changing projection data. In S1001, the control unit 301 is performing projection in one of the first projection mode to the third projection mode. That is to say, at the time of S1001, projection and a snow removal job are being performed.

In S002, the control unit 302 obtains information related to snow accumulation. The information related to snow accumulation mentioned here is information indicating the depth of accumulated snow, and is monitored during travel of the snowplow 101. The control unit 302 may obtain the information indicating the depth of accumulated snow from the detection unit 311, or may receive the information indicating the depth of accumulated snow from the server 102. Alternatively, both of such obtainment and reception may be performed.

In S1003, the control unit 302 determines whether to change projection data based on the information indicating the depth of accumulated snow obtained in S1002. For example, the control unit 302 determines to change the projection data upon transition from a state in which the change in topographical relief of the surface of accumulated snow is equal to or smaller than the threshold to a state in which the change is larger than the threshold. On the other hand, when it is determined that the projection data is not to be changed, the processing of FIG. 10 is ended, and the current projection and snow removal job are continued. In S1004, the control unit 302 changes the projection data. For example, the control unit 302 changes the current projection data to projection data that realizes stereoscopic viewing.

Although the foregoing has described the transition from the state in which the change in topographical relief is equal to or smaller than the threshold to the state in which the change is larger than the threshold in S1003, a reverse transition may be determined. That is to say, when the change in topographical relief of the surface of accumulated snow has become equal to or smaller than the threshold in S1003 in a state where projection is performed based on projection data that realizes stereoscopic viewing in S1001, the current projection data may be changed to projection data corresponding to a planar surface.

The processing of FIG. 10 makes it possible to switch to appropriate projection data as the state of snow accumulation ahead of the traveling snowplow 101 changes. Furthermore, the processing of FIG. 10 and the processing of FIG. 9 may be combined.

SUMMARY OF EMBODIMENT

A snowplow of the above-described embodiment is a snowplow having a snow removal mechanism, the snowplow including: an obtainment unit configured to obtain topography information prior to snow accumulation, and a projection unit configured to, based on the topography information prior to snow accumulation obtained by the obtainment unit, project an image indicating the topography information prior to snow accumulation on a surf ice of accumulated snow that is to be removed by the snow removal mechanism (FIG. 6). With this configuration, the image indicating the topography information prior to snow accumulation can be projected on the surface of accumulated snow.

Furthermore, the projection unit projects an image that shows a scene prior to snow accumulation on the surface of accumulated snow as the image indicating the topography information prior to snow accumulation. With this configuration, for example, a road prior to snow accumulation can be projected on the surface of accumulated snow.

Furthermore, the image indicating the topography information prior to snow accumulation is an image that is viewable stereoscopically. With this configuration, an operator can recognize the topography information prior to snow accumulation more intuitively.

Also, the projection unit further projects an image indicating information related to snow accumulation on the surface of accumulated snow (FIG. 7). Furthermore, the projection unit projects an image indicating information of a depth of accumulated snow on the surface of accumulated snow as the image indicating the information related to snow accumulation. Moreover, the projection unit projects an image indicating information of a no quality on the surface of accumulated snow as the image indicating the information related to snow accumulation. With this configuration, for example, information of the depth of accumulated snow and the snow quality can be projected on the surface of accumulated snow.

Furthermore, the image indicating the information of the depth of accumulated snow is an image indicating a contour line. With this configuration, projection of the image indicating the contour line enables the operator to easily recognize the recessed/projecting states on the surface of accumulated snow.

Also, an acceptance unit and a control unit me further included, the acceptance unit being, configured to accept a setting of a projection mode, the control unit being configured to, based on the setting of the projection mode accepted by the acceptance unit, cause the projection unit to project at least one of the image indicating the topography information prior to snow accumulation and the image indicating the information related to snow accumulation (FIG. 5). This configuration makes it possible to switch among projection modes in accordance with a setting configured by the operator.

Also, a notification unit is further included that is configured to, when a predetermined event has occurred, give notification of the occurrence of the event. Furthermore, upon detecting an object approaching the snowplow, the notification unit gives notification of an existence of the approaching object. Moreover, the notification unit gives the notification by causing the projection unit to project an image that gives notification of the existence of the approaching object on the surface of accumulated snow (FIG. 9, FIG. 16). With this configuration, for example, when there is a person approaching the snowplow 101 during a snow removal job, a notification indicating the same can be provided via projection.

Also, a generation unit is further included that is configured to generate projection data based on the topography information prior to snow accumulation obtained by the obtainment unit, and the projection unit projects the image indicating the topography information prior to snow accumulation on the surface of accumulated snow based on the projection data (FIG. 6). With this configuration, the projection data can be generated based on the topography information prior to snow accumulation on the snowplow.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 101 snowplow
102 server
226, 310 projection unit
301 control unit
302, 401 processor
303, 402 memory
304, 403 storage unit
406 topography information DB

What is claimed is:

1. A snowplow having a snow removal mechanism, the snowplow comprising:
   an obtainment unit configured to obtain topography information prior to snow accumulation; and
   a projection unit configured to, based on the topography information prior to snow accumulation obtained by the obtainment unit, project an image indicating the topography information prior to snow accumulation on a surface of accumulated snow that is to be removed by the snow removal mechanism,
   wherein the projection unit further projects an image indicating information related to snow accumulation on the surface of accumulated snow, and
   wherein the projection unit projects an image indicating information of a snow quality on the surface of accumulated snow as the image indicating the information related to snow accumulation.

2. The snowplow according to claim 1, wherein
   the projection unit projects an image that shows a scene prior to snow accumulation on the surface of accumulated snow as the image indicating the topography information prior to snow accumulation.

3. The snowplow according to claim 1, wherein
the image indicating the topography information prior to snow accumulation is an image that is viewable stereoscopically.

4. The snowplow according to claim 1, wherein
the projection unit projects an image indicating information of a depth of accumulated snow on the surface of accumulated snow as the image indicating the information related to snow accumulation.

5. The snowplow according to claim 4, wherein
the image indicating the information of the depth of accumulated snow is an image indicating a contour line.

6. The snowplow according to claim 1, further comprising:
an acceptance unit configured to accept a setting of a projection mode; and
a control unit configured to, based on the setting of the projection mode accepted by the acceptance unit, cause the projection unit to project at least one of the image indicating the topography information prior to snow accumulation and the image indicating the information related to snow accumulation.

7. The snowplow according to claim 1, further comprising
a notification unit configured to, when a predetermined event has occurred, give notification of the occurrence of the event.

8. The snowplow according to claim 7, wherein
upon detecting an object approaching the snowplow, the notification unit gives notification of an existence of the approaching object.

9. The snowplow according to claim 8, wherein
the notification unit gives the notification by causing the projection unit to project an image that gives notification of the existence of the approaching object on the surface of accumulated snow.

10. The snowplow according to claim 1, further comprising
a generation unit configured to generate projection data based on the topography information prior to snow accumulation obtained by the obtainment unit,
wherein the projection unit projects the image indicating the topography information prior to snow accumulation on the surface of accumulated snow based on the projection data.

11. A projection method executed on a snowplow having a snow removal mechanism, the projection method comprising:
obtaining topography information prior to snow accumulation;
based on the obtained topography information prior to snow accumulation, projecting an image indicating the topography information prior to snow accumulation on a surface of accumulated snow that is to be removed by the snow removal mechanism; and
projecting an image indicating information related to snow accumulation on the surface of accumulated snow, and projecting an image indicating information of a snow quality on the surface of accumulated snow as the image indicating the information related to snow accumulation.

12. A non-transitory computer-readable storage medium that stores a program for causing a computer to operate so as to:
obtain topography information prior to snow accumulation;
based on the obtained topography information prior to snow accumulation, project an image indicating the topography information prior to snow accumulation on a surface of accumulated snow that is to be removed by a snow removal mechanism of a snowplow; and
project an image indicating information related to snow accumulation on the surface of accumulated snow, and project an image indicating information of a snow quality on the surface of accumulated snow as the image indicating the information related to snow accumulation.

13. A projection system including a snowplow having a snow removal mechanism and a server,
the server including:
a storage unit configured to store topography information prior to snow accumulation;
a first obtainment unit configured to obtain position information from the snowplow; and
a transmission unit configured to, based on the position information obtained by the first obtainment unit, transmit corresponding topography information to the snowplow, the corresponding topography information being included in the topography information prior to snow accumulation stored in the storage unit,
the snowplow including:
a reception unit configured to receive the corresponding topography information transmitted from the transmission unit; and
a projection unit configured to, based on the corresponding topography information received by the reception unit, project an image indicating the topography information prior to snow accumulation on a surface of accumulated snow that is to be removed by the snow removal mechanism,
wherein the projection unit further projects an image indicating information related to snow accumulation on the surface of accumulated snow, and
wherein the projection unit projects an image indicating information of a snow quality on the surface of accumulated snow as the image indicating the information related to snow accumulation.

* * * * *